(12) United States Patent
Kikuchi et al.

(10) Patent No.: US 6,573,323 B2
(45) Date of Patent: Jun. 3, 2003

(54) ALUMINUM HYDROXIDE, AND TIRE TREAD RUBBER COMPOSITION AND PNEUMATIC TIRE EMPLOYING THE ALUMINUM HYDROXIDE

(75) Inventors: Naohiko Kikuchi, Kobe (JP); Takeshi Ota, Kobe (JP); Satoru Nippa, Niihama (JP); Mamoru Uchida, Kobe (JP)

(73) Assignees: Sumitomo Rubber Industries, Ltd., Hyogo (JP); Sumitomo Chemical Company, Limited, Osaka (JP)

( * ) Notice: Subject to any disclaimer, the term of this patent is extended or adjusted under 35 U.S.C. 154(b) by 28 days.

(21) Appl. No.: 09/747,980

(22) Filed: Dec. 27, 2000

(65) Prior Publication Data

US 2001/0023271 A1 Sep. 20, 2001

(30) Foreign Application Priority Data

Dec. 27, 1999 (JP) .......................................... 11-369982
Dec. 27, 1999 (JP) .......................................... 11-369983
Dec. 27, 1999 (JP) .......................................... 11-370672

(51) Int. Cl.$^7$ .................................................. C08F 3/00
(52) U.S. Cl. ..................................... 524/437; 524/495
(58) Field of Search ............................... 524/487, 495, 524/496; 525/261, 314, 315, 316, 327.5, 332.9, 333.8, 333.1

(56) References Cited

U.S. PATENT DOCUMENTS

| 4,175,118 A | 11/1979 | Wassermann et al. |
| 4,661,547 A | 4/1987 | Harada et al. |
| 5,055,019 A | 10/1991 | Meyer et al. |
| 5,955,142 A | 9/1999 | Yoshino et al. |
| 6,130,283 A * | 10/2000 | Nippa et al. ............. 524/437 |
| 6,242,522 B1 * | 6/2001 | Ezawa et al. ............. 524/437 |

FOREIGN PATENT DOCUMENTS

| EP | 0387856 | 9/1990 | |
| EP | 0 807 603 A2 * | 11/1997 | ............. C01F/7/02 |
| EP | 0890605 | 1/1999 | |
| GB | 1143787 | 2/1969 | |

* cited by examiner

Primary Examiner—Edward J. Cain
Assistant Examiner—Katarzyna I Wyrozebski-Lee
(74) Attorney, Agent, or Firm—Birch, Stewart, Kolasch & Birch, LLP

(57) ABSTRACT

Disclosed herein is an aluminum hydroxide having specific characteristics, and a tire tread rubber composition and a pneumatic tire employing the aluminum hydroxide, which allow grip performance and abrasion resistance to increase and rolling resistance to decrease and are superior in processibility. The aluminum hydroxide has a loosed bulk density of not more than 0.60 g/cm$^3$, a DOP oil absorption of at least 70 cm$^3$/100 g and less than 250 cm$^3$/100 g, and a BET specific surface area of at least 30 m$^2$/g and less than 350 m$^2$/g. 5–150 parts by weight of the aluminum hydroxide is blended with 100 parts by weight of a rubber component to obtain the tire tread rubber composition. The rubber component preferably includes at least 60 parts by weight of styrene-butadiene rubber having a styrene content of 20–60% by weight.

12 Claims, No Drawings

US 6,573,323 B2

ALUMINUM HYDROXIDE, AND TIRE TREAD RUBBER COMPOSITION AND PNEUMATIC TIRE EMPLOYING THE ALUMINUM HYDROXIDE

BACKGROUND OF THE INVENTION

1. Field of the Invention

The present invention relates to aluminum hydroxide, and a tire tread rubber composition and a pneumatic tire employing the aluminum hydroxide. More particularly, the present invention relates to aluminum hydroxide having specific characteristics; a tire tread rubber composition having the aluminum hydroxide blended therein, which allows grip performance on a wet road surface (wet grip performance) and abrasion resistance to increase and allows rolling resistance to decrease to improve fuel efficiency; and a pneumatic tire employing the tire tread rubber composition.

2. Description of the Background Art

In recent years, in response to the demands for fuel-efficient automobiles, fuel-efficient tires with decreased rolling resistance have been developed. As a technique to decrease the rolling resistance, carbon black conventionally used as a reinforcing agent for tread rubber has been partially replaced with silica, in an effort to balance the antinomic properties of fuel efficiency and wet grip performance.

When compared to the conventional rubber composition with carbon black blended therein, however, the rubber composition with silica blended therein exhibits various problems in terms of processibility. Specifically, it easily decomposes because of high viscosity of unvulcanizate, and is poor in dimensional stability after extrusion. Thus, a tread rubber composition satisfying both the processibility and the performance has been desired.

Several techniques for improving the wet grip performance have also been proposed. One of such techniques is to increase a glass transition temperature (Tg) of a rubber component, or, to increase loss tangent (tanδ value) at 0° C. Another technique is to blend carbon black of small particle size into a rubber composition with high loading. If the glass transition temperature (Tg) is increased, however, low temperature performance deteriorates and the rolling resistance increases. The rubber composition heavy-loaded with the carbon black of small particle size also suffers a disadvantage that its rolling resistance increases.

SUMMARY OF THE INVENTION

An object of the present invention is to provide a filler for tire, and a tread rubber composition and a pneumatic tire employing the same filler, that can solve the above-described problems by allowing wet grip performance and abrasion resistance to increase, rolling resistance to decrease for improvement of fuel efficiency, and achieving superior processibility at the same time.

According to an aspect of the present invention, aluminum hydroxide is provided which has a loosed bulk density of not more than 0.60 g/cm$^3$, a DOP oil absorption of at least 70 cm$^3$/100 g and less than 250 cm$^3$/100 g, and a BET specific surface area of at least 30 m$^2$/g and not more than 350 m$^2$/g. Particularly, the loosed bulk density of at least 0.10 g/cm$^3$ and not more than 0.35 g/cm$^3$ is preferable.

The aluminum hydroxide preferably has a crystal structure of boehmite type, having a crystal size of boehmite (002) plane of at least 5 nm and not more than 20 nm.

According to another aspect of the present invention, a tire tread rubber composition is provided which is obtained by blending and kneading 5–150 parts by weight of the aluminum hydroxide as described above with 100 parts by weight of a rubber component.

The rubber component is preferably composed of at least 20 parts by weight of styrene-butadiene rubber having a glass transition temperature (Tg) of not more than −27° C. and at least 20 parts by weight of diene type rubber including at least one kind of rubber selected from natural rubber, polyisoprene rubber and polybutadiene rubber. In the tire tread rubber composition, 5–60 parts by weight of carbon black having a BET specific surface area of at least 60 m$^2$/g is preferably blended with respect to 100 parts by weight of the rubber component. Further, in the tire tread rubber composition, 2–20% by weight of silane coupling agent is preferably blended with respect to the weight of the aluminum hydroxide.

Alternatively, the tire tread rubber composition may employ a rubber component that includes at least 60 parts by weight of styrene-butadiene rubber having a styrene content of 20–60% by weight. 10–100 parts by weight of carbon black having a BET specific surface area of at least 60 m$^2$/g may be added with respect to 100 parts by weight of this rubber component, and/or 2–20% by weight of silane coupling agent may be blended with respect to the weight of the aluminum hydroxide.

According to a further aspect of the present invention, a pneumatic tire is provided which employs the tire tread rubber composition as described above.

The foregoing and other objects, features, aspects and advantages of the present invention will become more apparent from the following detailed description of the present invention.

DESCRIPTION OF THE PREFERRED EMBODIMENTS

The aluminum hydroxide according to the present invention has a loosed bulk density, as measured conforming to JIS H1902, of not more than 0.60 g/cm$^3$, and preferably at least 0.10 g/cm$^3$ and not more than 0.35 g/cm$^3$. If it is greater than 0.60 g/cm$^3$, abrasion resistance of the rubber composition considerably deteriorates. If it is too low, torque when kneading the aluminum hydroxide and the rubber increases, thereby degrading the workability.

Further, the aluminum hydroxide described above has a DOP oil absorption, as measure conforming to JIS K6221, of at least 70 cm$^3$/100 g and less than 250 cm$^3$/100 g, and preferably at least 90 cm$^3$/100 g and not more than 150 cm$^3$/100 g. If it is out of such a range, the rubber composition suffers degradation of its abrasion resistance.

Still further, for the purposes of achieving a rubber composition having an effect to decrease the rolling resistance and exhibiting sufficient grip performance, the aluminum hydroxide has a BET specific surface area, as measured by nitrogen adsorption, of at least 30 m$^2$/g and not more than 350 m$^2$/g, preferably at least 30 m$^2$/g and not more than 200 m$^2$/g, and more preferably more than 100 m$^2$/g and not more than 200 m$^2$/g. If it exceeds 350 m$^2$/g, torque when kneading the aluminum hydroxide and the rubber may increase, thereby degrading the workability.

Moreover, for the purposes of further improving the grip performance, the abrasion resistance and the effect to decrease the rolling resistance of the rubber composition, the aluminum hydroxide of the present invention preferably has a crystal structure of boehmite type. More preferably, the crystal size of boehmite (020) plane is at least 5 nm and not more than 20 nm.

The crystal size was calculated as follows. Peaks of the boehmite (020) planes were measured from the profile obtained using an X-ray diffractometer. For these peaks of the crystal planes, fitting was conducted, based on the Gaussian distribution, using software for "multi-peak separation" of RINT 2100. Using the half-value width of the calculated result and the peak angle obtained by the barycentric method, the crystal size was calculated by the Scherrer's formula. The measurement conditions for the X-ray diffraction were as follows.

Measurement device: Rint-2100 V from Rigaku International Corporation.

Measurement conditions: Cu target; Voltage×Current=40 kV×40 mA; Slit: DS1°–SS1°–RS 0.3 mm; Scan mode: continuous; Scan speed=2°/min; Scan step=0.010°/step; Scan axis: 2 θ/θ; Scan range: 2–70°; and Rotation speed: 0 rpm.

A blended amount of the aluminum hydroxide described above is 5–150 parts by weight, preferably 5–80 parts by weight, and particularly 5–60 parts by weight, with respect to 100 parts by weight of the rubber component described above. If it is less than 5 parts by weight, the decrease of the rolling resistance by virtue of such addition is not adequate, and the grip performance against a wet road surface is improved only to a small extent. If the blended amount exceeds 150 parts by weight, viscosity of the rubber composition becomes too high, which deteriorates the processibility as well as the abrasion resistance.

One way of producing the aluminum hydroxide of the present invention is as follows. Aluminum alkoxide is hydrolized to obtain slurry of aluminum hydroxide, which is passed through a continuous wet grinder or the like to obtain suspension. The obtained suspension is alkalinized, then subjected to heat treatment at about 100° C. to about 140° C. for about 10 hours to about 100 hours, and then dried using a flash dryer or the like. In this method of producing the aluminum hydroxide, it is preferable that the suspension having undergone the heat treatment is subjected to solid-liquid separation to extract the solid content (aluminum hydroxide), and then the solid content is washed to remove impurities.

In the present invention, various kinds of rubber that are generally used for a tire tread rubber, e.g., natural rubber, polyisoprene rubber and polybutadiene rubber, may be used as a rubber component.

The rubber component employed in the present invention preferably includes at least 20 parts by weight of styrene-butadiene rubber having a glass transition temperature (Tg) of not more than −27° C. Conventionally, in order to balance the antinomic properties of improved wet grip performance and decreased rolling resistance, styrene-butadiene rubber with a relatively high glass transition temperature (Tg) has been employed. In this case, however, there is a limit for the improvement of the rolling resistance, and the abrasion resistance tends to be degraded. Thus, according to the present invention, the glass transition temperature (Tg) of styrene-butadiene rubber is made not to exceed −27° C. so as to improve the rolling resistance. For the purposes of maintaining good wet grip performance, the styrene-butadiene rubber is preferably made to have a glass transition temperature in a range between −30° C. and −50° C., and more preferably, at least 50 parts by weight thereof is blended in the rubber component.

When employing such a rubber component, the aluminum hydroxide is preferably added 5–60 parts by weight with respect to 100 parts by weight of the rubber component.

In this case, at least 20 parts by weight of at least one kind of rubber selected from natural rubber (NR), polyisoprene rubber (IR), low cis-polybutadiene rubber (low cis-BR) and high cis-polybutadiene rubber (high cis-BR) is also included as another rubber component. Preferably, these rubber components each have a glass transition temperature (Tg) of not more than −27° C., and work together with the above-described styrene-butadiene rubber to improve the wet grip performance, rolling resistance and abrasion resistance, totally in a well balanced manner.

As another embodiment of the present invention, the rubber component being used for the tire tread rubber composition preferably includes styrene-butadiene rubber having a styrene content of 20–60% by weight. If the styrene content is less than 20% by weight, the grip performance in the low and high temperature regions is not improved. If it exceeds 60% by weight, block rigidity increases, so that the "bite" of the rubber on contact with the road surface becomes poor, making it impossible to achieve a desired gripping force. In particular, the styrene content of 30–45% by weight is preferable. Such styrene-butadiene rubber is synthesized by emulsion polymerization, solution polymerization or the like.

When employing such a rubber component, the aluminum hydroxide is preferably blended 5–80 parts by weight with respect to 100 parts by weight of the rubber component.

Here, other rubber components that may be used for the tire tread rubber composition include: natural rubber (NR), high cis 1,4 polybutadiene rubber, low cis 1,4 polybutadiene rubber, styrene-butadiene rubber (SBR) other than as described above, polyisoprene rubber (IR), butyl rubber (IIR), halogenated butyl rubber, acrylonitrile-butadiene rubber (NBR), acrylonitrile-styrene-butadiene rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonic polyethylene, acrylic rubber, epichlorohydrin rubber, silicone rubber and urethane rubber. Any of them may be used alone, or at least two kinds thereof may be blended together in any arbitrary proportions. In particular, for the purposes of improving processibility and abrasion resistance, NR, BR, SBR, IR, styrene-isoprene-butadiene copolymer rubber and the like are preferable.

Preferably, at least 60 parts by weight of the styrene-butadiene rubber having a styrene content within the above-described range is blended into the rubber component for use in the present invention. If the blended amount of the styrene-butadiene rubber is less than 60 parts by weight, the grip performance in the low and high temperature regions cannot be improved.

Further, the carbon black being blended into the tread rubber composition of the present invention preferably has a BET specific surface area, as measured by nitrogen adsorption, of at least 60 m$^2$/g, preferably 70–220 m$^2$/g, and more preferably 70–200 m$^2$/g. The BET specific surface area of less than 60 m$^2$/g is not preferable, since an adequate level of abrasion resistance cannot be expected. Here, the BET specific surface area was measured conforming to the ASTMD 4820-99 method.

If the carbon black is being blended into a rubber component including at least 60 parts by weight of styrene-butadiene rubber having a styrene content of 20–60% by weight, the blended amount of the carbon black is 10–100 parts by weight, preferably 30–100 parts by weight, and more preferably 40–100 parts by weight, with respect to 100 parts by weight of the rubber component. If the weight of the carbon black is less than 10 parts by weight, abrasion resistance is deteriorated. If it exceeds 100 parts by weight, viscosity of the rubber increases, thereby degrading the processibility.

In the case where the carbon black is being blended into a rubber component including at least 20 parts by weight of styrene-butadiene rubber having a glass transition temperature (Tg) of not more than −27° C., the blended amount of the carbon black is 5–60 parts by weight, preferably 10–60 parts by weight, and more preferably 20–60 parts by weight, with respect to 100 parts by weight of the rubber component. If it is less than 5 parts by weight, abrasion resistance becomes poor. If it exceeds 60 parts by weight, viscosity of the rubber increases, thereby deteriorating the processibility.

Still further, for the purposes of further reinforcing the aluminum hydroxide, 2–20% by weight of silane coupling agent may be added with respect to the blended amount of the aluminum hydroxide. The silane coupling agents that may be used here include: bis(3-triethoxysilylpropyl) tetrasulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, and 2-chloroethyltriethoxysilane. Among them, bis(3-triethoxysilylpropyl)tetrasulfide is preferable for balancing the cost and the effect expected by adding the coupling agent.

The rubber composition of the present invention may be used together with other fillers, such as silica, clay and the like. It may also be blended, if necessary, with various kinds of additives including process oil, antioxidant, stealic acid, zinc oxide and wax, and of course with vulcanizing agents such as sulfur, vulcanization accelerator and the like.

EXAMPLES

Examples A, B and Comparative Examples C, D and E

The aluminum hydroxide employed in each of these examples and comparative examples was produced as follows. Characteristic values thereof are shown in Table 1.

Example A (Aluminum Hydroxide A)

376 g of aluminum hydroxide (loosed bulk density: 0.77 g/cm$^3$, DOP oil absorption: 70 cm$^3$/100 g) obtained by hydrolizing aluminum alkoxide was mixed with 5 dm$^3$ of water, and suspension having a solid content of 7% by weight was prepared. The suspension was passed through a continuous bead mill to let the aluminum hydroxide uniformly disperse in the suspension. The suspension after such dispersion was put into a stainless beaker, and adjusted to have a pH of 10 using 1N NaOH. With a refluxing device attached to the stainless beaker, the suspension within the stainless beaker was heated, left at 100° C. for 60 hours, and gradually cooled. The suspension was then separated to solid and liquid employing a centrifugal separator. After removing the supernatant liquid, the solid content was dispersed in 5 dm$^3$ of water added. A centrifugal separator was again used for solid-liquid separation thereof. The solid content thus obtained was dispersed in 5 dm$^3$ of newly added water to obtain slurry of aluminum hydroxide, which was passed through a continuous bead mill, and then dried with a flash dryer (trade name: Flash Jet Dryer, manufactured by Seishin Enterprise Co., Ltd.). Aluminum hydroxide A was thus obtained.

Physical properties of the aluminum hydroxide A obtained are shown in Table 1.

Example B (Aluminum Hydroxide B)

376 g of aluminum hydroxide (loosed bulk density: 0.77 g/cm$^3$, DOP oil absorption: 70 cm$^3$/100 g) obtained by hydrolizing aluminum alkoxide was mixed with 5 dm$^3$ of water, and suspension having a solid content of 7% by weight was prepared. 1N NaOH was used to set a pH of this suspension to 10. The suspension was then put into an autoclave and held at 120° C. for 24 hours. The suspension was gradually cooled, and then subjected to solid-liquid separation employing a centrifugal separator. After removing the supernatant liquid, the solid content was dispersed in 5 dm$^3$ of water added. Solid-liquid separation was conducted again using a centrifugal separator. The solid content obtained was dispersed in 5 dm$^3$ of newly added water to obtain slurry of aluminum hydroxide, which was passed through a continuous bead mill, and then dried using a flash dryer (trade name: Flash Jet Dryer, manufactured by Seishin Enterprise Co., Ltd.). Aluminum hydroxide B was thus obtained.

Physical properties of the obtained aluminum hydroxide B are shown in Table 1.

Comparative Example C (Aluminum Hydroxide C)

533 cm$^3$ of sodium alminate solution (sodium concentration: 125 g/dm$^3$ in terms of Na$_2$O, Na$_2$O/Al$_2$O$_3$ molar ratio: 1.55) as a basic solution and 880 cm$^3$ of aqueous aluminum sulfate solution (alminum concentration: 5.3% by weight in terms of Al$_2$O$_3$) as an acid solution were injected into a 2-dm$^3$ stainless bath provided with a baffle for about three minutes for neutralization. During the injection, the solutions were being cooled with ice and stirred using a homo-mixer (trade name: T. K. Homo-Jetter M type, manufactured by Tokushu Kika Kogyo Co., Ltd.) under the condition of shear rate of 11000 sec$^{-1}$. (The shear rate was derived from the peripheral velocity of the turbine of the homo-mixer, x m/sec, and the clearance between the turbine and the status, y mm, using an expression of $x/y \times 10^3$ sec$^{-1}$.) Thereafter, the stirring was continued for 15 minutes to obtain slurry of aluminum hydroxide. The maximum reachable temperature at the time of neutralization was 15° C.

A centrifugal separator was used for solid-liquid separation of the obtained slurry of aluminum hydroxide to extract the solid content. The solid content obtained was dispersed in 6 dm$^3$ of water added, to obtain slurry of aluminum hydroxide. Thereafter, solid-liquid separation using a centrifugal separator was repeated seven times to wash the aluminum hydroxide. Water was added to the solid content extracted after such washing to obtain slurry of aluminum hydroxide, which was then dried using a spray dryer (from Niro A/S, trade name: Mobile Minor Type, drying temperature: 250° C. at dryer inlet and 100° C. at dryer outlet, atomizing pressure: 0.12 MPa). Aluminum hydroxide C was thus obtained, of which physical properties are shown in Table 1.

Comparative Example D (Aluminum Hydroxide D)

800 cm$^3$ of sodium alminate solution (sodium concentration: 125 g/dm$^3$ in terms of $Na_2O$, $Na_2O/Al_2O_3$ molar ratio: 1.55) as a basic solution and 898 cm$^3$ of aqueous aluminum sulfate solution (alminum concentration: 3.2% by weight in terms of $Al_2O_3$) as an acid solution were injected into a 2-dm$^3$ stainless bath provided with a baffle for three minutes for neutralization. During the injection, the solutions were being cooled with ice and stirred using a homo-mixer (trade name: T. K. Homo-Jetter M type, manufactured by Tokushu Kika Kogyo Co., Ltd.) under the condition of shear rate of 11000 sec$^{-1}$. Thereafter, the stirring was continued for 15 minutes to obtain slurry of aluminum hydroxide. The maximum reachable temperature at the time of neutralization was 15° C. A centrifugal separator was used for solid-liquid separation of the obtained slurry of aluminum hydroxide to extract the solid content. The solid content obtained was dispersed in 6 dm$^3$ of water added, so that slurry of aluminum hydroxide was obtained. Thereafter, solid-liquid separation employing a centrifugal separator was repeated seven times to wash the aluminum hydroxide. Water was added to the solid content extracted after such washing to obtain slurry of aluminum hydroxide, which was then dried using a spray dryer (from Niro A/S, trade name: Mobile Minor Type, drying temperature: 250° C. at dryer inlet and 100° C. at dryer outlet, atomizing pressure: 0.12 MPa). Aluminum hydroxide D was thus obtained. Physical properties of the obtained aluminum hydroxide D are shown in Table 1.

Comparative Example E (Aluminum Hydroxide E)

Commercially available aluminum hydroxide (manufactured by Showa Denko K.K., trade name: Higilite H-43) was used without alternation.

As shown in Table 1, aluminum hydroxide C of Comparative example C and aluminum hydroxide D of Comparative example D each have a greater loosed bulk density and a smaller crystal size of boehmite (020) plane as compared with those of Examples A and B. Aluminum hydroxide E of Comparative example E has a BET specific surface area and a DOP oil absorption both smaller than those of Examples A and B, and its crystal structure is gibbsite, which is different from boehmite of Examples A and B.

TABLE 1

| | Kinds of aluminum hydroxide | Physical properties | | | | |
|---|---|---|---|---|---|---|
| | | Loosed bulk density; g/cm$^3$ | DOP oil absorption; cm$^3$/100 g | BET specific surface area; m$^2$g | Crystal structure | Crystal size of boehmite (020) plane; nm |
| Example A | aluminum hydroxide A | 0.21 | 121 | 153 | boehmite | 12.9 |
| Example B | aluminum hydroxide B | 0.33 | 80 | 208 | boehmite | 7.3 |
| Comparative example C | aluminum hydroxide C | 0.94 | 54 | 250 | boehmite | 2.4 |
| Comparative example D | aluminum hydroxide D | 0.61 | 84 | 110 | boehmite, bayerite | 3.0 |
| Comparative example E | aluminum hydroxide E | 0.20 | 55 | 8 | gibbsite | — |

Examples 1–11 and Comparative Examples 1–12

Tire tread rubber compositions and tires were produced as follows. Ingredients as shown in Tables 2 and 3 were blended as specified therein, and kneaded using a Banbury mixer to prepare respective rubber compositions. Processibility (Mooney viscosity) thereof was evaluated. Thereafter, an extruder was used to extrude the respective rubber compositions each into a tread shape, which was vulcanized in a mold to manufacture by trial a tire of a size of 185/65R14. For each tire obtained, abrasion resistance, rolling resistance and wet grip performance (ABS brakeage) were evaluated. The evaluation results are shown in Tables 2 and 3.

TABLE 2

|  |  |  | Examples | | | | | Comparative examples | | | | | |
| --- | --- | --- | --- | --- | --- | --- | --- | --- | --- | --- | --- | --- | --- |
|  | (Parts by weight) |  | 1 | 2 | 3 | 4 | 5 | 1 | 2 | 3 | 4 | 5 | 6 |
| Ingredients | SBR N. 9520(pure polymer) | ※1) | 70 | 70 | 70 | 70 | 50 | 70 | 70 | 70 | 70 | 70 | 70 |
|  | BR 150B | ※2) | 30 | 30 | 30 | 30 | 50 | 30 | 30 | 30 | 30 | 30 | 30 |
|  | Carbon black N220 | ※3) | 65 | 65 | 40 | 40 | 65 | 65 | 65 | 85 | 65 | 65 | 65 |
|  | Aluminum hydroxide A |  | 40 |  | 65 | 65 | 40 |  |  |  |  |  |  |
|  | Aluminum hydroxide B |  |  | 40 |  |  |  |  |  |  |  |  |  |
|  | Aluminum hydroxide C |  |  |  |  |  |  |  |  |  | 40 |  |  |
|  | Aluminum hydroxide D |  |  |  |  |  |  |  |  |  |  | 40 |  |
|  | Aluminum hydroxide E |  |  |  |  |  |  |  |  |  |  |  | 40 |
|  | Silica VN3 | ※4) |  |  |  |  |  | 40 |  |  |  |  |  |
|  | TESPT | ※5) |  |  |  | 5.2 |  | 3.2 |  |  |  |  |  |
|  | Aromatic oil (incl. oil extended polymer) | ※6) | 40 | 40 | 35 | 40 | 40 | 50 | 35 | 50 | 45 | 45 | 45 |
|  | Antioxidant | ※7) | 2.0 | 2.0 | 2.0 | 2.0 | 2.0 | 2.0 | 2.0 | 2.0 | 2.0 | 2.0 | 2.0 |
|  | WAX | ※8) | 2.0 | 2.0 | 2.0 | 2.0 | 2.0 | 2.0 | 2.0 | 2.0 | 2.0 | 2.0 | 2.0 |
|  | Stearic acid | ※9) | 2.0 | 2.0 | 2.0 | 2.0 | 2.0 | 2.0 | 2.0 | 2.0 | 2.0 | 2.0 | 2.0 |
|  | Zinc oxide | ※10) | 3.0 | 3.0 | 3.0 | 3.0 | 3.0 | 3.0 | 3.0 | 3.0 | 3.0 | 3.0 | 3.0 |
|  | Sulfur | ※11) | 2.0 | 2.0 | 2.0 | 2.0 | 2.0 | 2.0 | 2.0 | 2.0 | 2.0 | 2.0 | 2.0 |
|  | Vulcanization accelerator | ※12) | 1.0 | 1.0 | 1.0 | 1.0 | 1.0 | 1.0 | 1.0 | 1.0 | 1.0 | 1.0 | 1.0 |
| Evaluation | Mooney viscosity |  | 105 | 106 | 105 | 107 | 105 | 130 | 100 | 100 | 108 | 106 | 104 |
|  | Abrasion resistance |  | 100 | 98 | 98 | 103 | 103 | 94 | 95 | 100 | 74 | 65 | 81 |
|  | Rolling resistance |  | 108 | 110 | 113 | 118 | 113 | 106 | 125 | 100 | 108 | 110 | 111 |
|  | Wet grip performance (ABS brakeage) |  | 111 | 109 | 112 | 115 | 87 | 116 | 82 | 100 | 105 | 106 | 106 |

Details of the ingredients shown in Table 2 are as follows:

※1) SBR: styrene-butadiene rubber N9520 (from Nippon Zeon Corporation), styrene content: 35% by weight, 37.5 PHR oil extended rubber, glass transition temperature (Tg): −38° C.

※2) BR: polybutadiene rubber BR150B (from Ube Industries, Ltd.)

※3) carbon black: Diablack I (N220, from Mitsubishi Chemical Corporation), BET specific surface area by nitrogen adsorption: 115 $m^2/g$ ※4) silica: VN3 (from Degussa)

※5) silane coupling agent TESPT: Si-69 (from Degussa)

※6) aromatic oil: Diana Process PS32 (from Idemitsu Kosan Co., Ltd.)

※7) antioxidant: Ozonon 6C (from Seiko Chemical Co., Ltd.)

※8) WAX: Sannoc Wax (from Ouchishinko Chemical Industrial Co., Ltd.)

※9) stearic acid: Kiri (from NOF Corp.)

※10) zinc oxide: Zinc Oxide #2 (from Mitsui Mining & Smelting Co., Ltd.)

※11) sulfur: Sulfur (from Karuizawa Seirensho Co., Ltd.)

※12) vulcanization accelerator: Nocceler CZ (from Ouchishinko Chemical Industrial Co., Ltd.)

TABLE 3

|  |  |  | Examples | | | | | | Comparative Examples | | | | | |
| --- | --- | --- | --- | --- | --- | --- | --- | --- | --- | --- | --- | --- | --- | --- |
|  | (Parts by weight) |  | 6 | 7 | 8 | 9 | 10 | 11 | 7 | 8 | 9 | 10 | 11 | 12 |
| Ingredients | SBR 1502 | ※1) | 70 | 70 | 70 | 70 | 100 | — | 70 | 70 | 70 | 70 | 70 | 70 |
|  | NR | ※2) | 30 | 30 | 30 | 30 |  | 30 | 30 | 30 | 30 | 30 | 30 | 30 |
|  | SBR N9550 | ※3) |  |  |  |  |  | 70 |  |  |  |  |  |  |
|  | Carbon black N339 | ※4) | 40 | 40 | 40 | 40 | 40 | 40 | 40 | 40 | 60 | 40 | 40 | 40 |
|  | Aluminum hydroxide A |  | 20 |  |  | 30 | 20 | 20 | 20 |  |  |  |  |  |
|  | Aluminum hydroxide B |  |  |  | 20 |  |  |  |  |  |  |  |  |  |
|  | Aluminum hydroxide C |  |  |  |  |  |  |  |  |  |  |  |  | 20 |
|  | Aluminum hydroxide D |  |  |  |  |  |  |  |  |  |  | 20 |  |  |
|  | Aluminum hydroxide E |  |  |  |  |  |  |  |  |  |  |  | 20 |  |
|  | Silica VN3 | ※5) |  |  |  |  |  |  | 20 |  |  |  |  |  |
|  | TESPT | ※6) |  |  |  | 2 |  | 2 | 2 |  |  |  |  |  |
|  | Aromatic oil | ※7) | 15 | 15 | 10 | 15 | 15 | 15 | 20 | 10 | 20 | 15 | 15 | 15 |
|  | Antioxidant | ※8) | 2.0 | 2.0 | 2.0 | 2.0 | 2.0 | 2.0 | 2.0 | 2.0 | 2.0 | 2.0 | 2.0 | 2.0 |
|  | WAX | ※9) | 2.0 | 2.0 | 2.0 | 2.0 | 2.0 | 2.0 | 2.0 | 2.0 | 2.0 | 2.0 | 2.0 | 2.0 |
|  | Stearic acid | ※10) | 2.0 | 2.0 | 2.0 | 2.0 | 2.0 | 2.0 | 2.0 | 2.0 | 2.0 | 2.0 | 2.0 | 2.0 |
|  | Zinc oxide | ※11) | 3.0 | 3.0 | 3.0 | 3.0 | 3.0 | 3.0 | 3.0 | 3.0 | 3.0 | 3.0 | 3.0 | 3.0 |
|  | Sulfur | ※12) | 2.0 | 2.0 | 2.0 | 2.0 | 2.0 | 2.0 | 2.0 | 2.0 | 2.0 | 2.0 | 2.0 | 2.0 |
|  | Vulcanization accelerator | ※13) | 1.0 | 1.0 | 1.0 | 1.0 | 1.0 | 1.0 | 1.0 | 1.0 | 1.0 | 1.0 | 1.0 | 1.0 |
| Evaluation | Mooney viscosity |  | 95 | 97 | 95 | 98 | 95 | 102 | 120 | 95 | 100 | 96 | 94 | 98 |
|  | Abrasion resistance |  | 100 | 98 | 98 | 103 | 102 | 100 | 94 | 80 | 100 | 69 | 85 | 78 |
|  | Rolling resistance |  | 110 | 112 | 115 | 118 | 88 | 80 | 109 | 121 | 100 | 112 | 111 | 110 |
|  | Wet grip performance (ABS brakeage) |  | 111 | 110 | 112 | 114 | 110 | 120 | 105 | 82 | 100 | 106 | 106 | 105 |

Details of the ingredients shown in Table 3 are as follows:

X1) SBR: styrene-butadiene rubber SBR1502 (from Sumitomo Chemical Co., Ltd.), glass transition temperature (Tg): −48° C., styrene content: 23.5% by weight X2) NR: natural rubber RSS#1

X3) SBR: styrene-butadiene rubber N9550 (from Nippon Zeon Corporation), glass transition temperature (Tg): −26° C., styrene content: 45% by weight X4) carbon black: Sho Black N339 (from Showa Cabot K. K.), BET specific surface area by nitrogen adsorption: 90 $m^2/g$ X5) silica: VN3 (from Degussa)

X6) silane coupling agent TESPT: Si-69 (from Degussa)

X7) aromatic oil: Diana Process PS32 (from Idemitsu Kosan Co., Ltd.)

X8) antioxidant: Ozonon 6C (from Seiko Chemical Co., Ltd.)

X9) WAX: Sannoc Wax (from Ouchishinko Chemical Industrial Co., Ltd.)

X10) stearic acid: Kiri (from NOF Corp.)

X11) zinc oxide: Zinc Oxide #2 (from Mitsui Mining & Smelting Co., Ltd.)

X12) sulfur: Sulfur (from Karuizawa Seirensho Co., Ltd.)

X13) vulcanization accelerator: Nocceler CZ (from Ouchishinko Chemical Industrial Co., Ltd.)

Evaluation methods employed for Examples 1–11 and Comparative examples 1–12 are as follows.

(1) Mooney Viscosity ML (1+4)

The Mooney viscosity was measured using MV-202 (from Shimadzu Corporation), conforming to JIS K 6300. The measurements were represented as indices, with those for Comparative example 3 in Table 2 and Comparative example 9 in Table 3 being respectively set to 100. The measurement was performed at 130° C. The greater the index, the poorer the factors of processibility, such as extrusion, become.

(2) Abrasion Resistance

An abrasion resistance test was conducted using a Lambourn abrasion tester FT-702 (from Iwamoto Seisakusho Co., Ltd.), conforming to JIS K 6264. The measurement was performed at 23° C. for five minutes, with a slip ratio of 30% and applying load of 40N, to measure the volume of abrasion loss. The measurements were represented as indices, with those for Comparative example 3 in Table 2 and Comparative example 9 in Table 3 being respectively set to 100. The greater the index, the better the abrasion resistance becomes.

(3) Rolling Resistance

The rolling resistance was measured using a drum type rolling resistance measuring device having a diameter of 1707.6 mm (from Kobe Steel, Ltd.). The measurements were represented as indices, with those for Comparative example 3 in Table 2 and Comparative example 9 in Table 3 being respectively set to 100. The greater the index, the lower the rolling resistance becomes. The measurement conditions were as follows: internal pressure: 200 KPa, load: 3.4 KN, rim: 5.5 JJ×14, speed: 80 km/h.

(4) Wet Grip Performance (ABS Brakeage)

Tires were attached to a passenger car of 1800-cc class provided with ABS (antilock brake system), and deceleration was calculated from a stopping distance from 100 km/h on an asphalt-paved road surface. The calculated results were represented as indices, with those for Comparative example 3 in Table 2 and Comparative example 9 in Table 3 being respectively set to 100. The greater the index, the more the brakeage, and accordingly the grip performance improves. The road surface used for the ABS brakeage test was the asphalt-paved road surface with a skid number of about 50 (wet road surface condition).

Referring to Table 2, Comparative example 1 using silica exhibits high Mooney viscosity, which means that the processibility is poor. Comparative example 2 having no aluminum hydroxide blended therein is inferior in ABS brakeage. Comparative example 4 using aluminum hydroxide C whose crystal size of boehmite (020) plane is small and whose loosed bulk density is great, Comparative example 5 using aluminum hydroxide D, and Comparative example 6 using aluminum hydroxide E whose BET specific surface area is small and whose crystal structure is of gibbsite type, all exhibit considerably poor abrasion resistance.

In contrast to these comparative examples, Examples 1–4 are significantly improved in rolling resistance and wet grip performance (ABS brakeage), without their processibility or abrasion resistance being sacrificed. Example 5 containing less than 60 parts by weight of styrene-butadiene rubber having a styrene content of 20–60% by weight is slightly inferior in ABS brakeage.

Referring to Table 3, Comparative example 7 using silica exhibits high Mooney viscosity, which means it is poor in processibility. Comparative example 8 having no aluminum hydroxide blended therein is inferior in ABS brakeage. Comparative example 12 using aluminum hydroxide C whose crystal size of boehmite (020) plane is small and whose loosed bulk density is great, Comparative example 10 using aluminum hydroxide D, and Comparative example 11 using aluminum hydroxide E whose BET specific surface area is small and whose crystal structure is of gibbsite type, all exhibit considerably degraded abrasion resistance.

In contrast to these comparative examples, Examples 6–9 exhibit greatly improved rolling resistance and wet grip performance (ABS brakeage), without their processibility or abrasion resistance being deteriorated. Example 10 not including natural rubber (NR), polyisoprene rubber (IR) or polybutadiene rubber (BR), and Example 11 employing styrene-butadiene rubber (SBR) whose glass transition temperature (Tg) is higher than −27° C., are both slightly inferior in rolling resistance.

As explained above, aluminum hydroxide of the present invention possesses specific characteristics. A tire tread rubber composition having such aluminum hydroxide blended therein allows wet grip performance and abrasion resistance to increase, rolling resistance to decrease to improve fuel efficiency, and enjoys improved processibility. A pneumatic tire employing such a tread rubber composition is also superior in these characteristics.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Aluminum hydroxide having a loosed bulk density of not more than 0.60 $g/cm^3$, a DOP oil absorption of at least 70 $cm^3/100$ g and less than 250 $cm^3/100$ g, and a BET specific surface area of at least 30 $m^2/g$ and not more than 350 $m^2/g$.

2. The aluminum hydroxide according to claim 1, wherein the loosed bulk density is at least 0.10 g/cm$^3$ and not more than 0.35 g/cm$^3$.

3. The aluminum hydroxide according to claim 1, having a boehmite crystal structure.

4. The aluminum hydroxide according to claim 3, having a crystal size of boehmite (020) plane of at least 5 nm and not more than 20 nm.

5. A tire tread rubber composition having 5–150 parts by weight of the aluminum hydroxide according to claim 1 blended with 100 parts by weight of a rubber component.

6. The tire tread rubber composition according to claim 5, wherein the rubber component is composed of at least 20 parts by weight of styrene-butadiene rubber having a glass transition temperature (Tg) of not more than −27° C. and at least 20 parts by weight of diene rubber including at least one kind of rubber selected from the group consisting of natural rubber, polyisoprene rubber and polybutadiene rubber.

7. The tire tread rubber composition according to claim 6, having 5–60 parts by weight of carbon black having a BET specific surface area of at least 60 m$^2$/g blended with respect to 100 parts by weight of the rubber component.

8. The tire tread rubber composition according to claim 7, having 2–20% by weight of silane coupling agent blended with respect to the weight of said aluminum hydroxide.

9. The tire tread rubber composition according to claim 5, wherein the rubber component includes at least 60 parts by weight of styrene-butadiene rubber having a styrene content of 20–60% by weight.

10. The tire tread rubber composition according to claim 9, having 10–100 parts by weight of carbon black having a BET specific surface area of at least 60 m$^2$/g blended with respect to 100 parts by weight of the rubber component.

11. The tire tread rubber composition according to claim 10, having 2–20% by weight of silane coupling agent blended with respect to the weight of said aluminum hydroxide.

12. A pneumatic tire employing the tire tread rubber composition according to claim 5.

* * * * *